US012570582B2

(12) United States Patent (10) Patent No.: US 12,570,582 B2
Mäkikouri et al. (45) Date of Patent: Mar. 10, 2026

(54) CONTROLLING CARBONATION

(71) Applicant: CARBONAIDE OY, Joensuu (FI)

(72) Inventors: Sampo Mäkikouri, Tampere (FI);
Tapio Vehmas, VTT (FI)

(73) Assignee: CARBONAIDE OY, Joensuu (FI)

( * ) Notice: Subject to any disclaimer, the term of this
patent is extended or adjusted under 35
U.S.C. 154(b) by 559 days.

(21) Appl. No.: 18/010,167

(22) PCT Filed: Jun. 14, 2021

(86) PCT No.: PCT/FI2021/050446
§ 371 (c)(1),
(2) Date: Dec. 13, 2022

(87) PCT Pub. No.: WO2021/255340
PCT Pub. Date: Dec. 23, 2021

(65) Prior Publication Data

US 2023/0242456 A1 Aug. 3, 2023

(30) Foreign Application Priority Data

Jun. 15, 2020 (FI) ...................................... 20205623

(51) Int. Cl.
*C04B 40/02* (2006.01)
*C04B 28/08* (2006.01)
*C04B 103/40* (2006.01)
*C04B 111/22* (2006.01)

(52) U.S. Cl.
CPC .......... *C04B 40/0236* (2013.01); *C04B 28/08*
(2013.01); *C04B 2103/40* (2013.01); *C04B*
*2111/22* (2013.01)

(58) Field of Classification Search
CPC . C04B 40/0236; C04B 28/08; C04B 2103/40;
C04B 2111/22; C04B 28/18; C04B
40/0231; C04B 33/021; C04B 14/04;
C04B 14/26; Y02P 40/18; Y02W 30/91
See application file for complete search history.

(56) References Cited

U.S. PATENT DOCUMENTS

| | | | |
|---|---|---|---|
| 4,036,931 A | 7/1977 | Roberson et al. | |
| 9,028,607 B2 | 5/2015 | Ramme | |
| 2012/0312194 A1 | 12/2012 | Riman et al. | |
| 2020/0165170 A1 | 5/2020 | Niven et al. | |

FOREIGN PATENT DOCUMENTS

| | | |
|---|---|---|
| CN | 106542551 A | 3/2017 |
| EP | 3831795 A1 | 6/2021 |
| JP | 2008-105930 A | 5/2008 |
| WO | WO2017/117475 A1 | 7/2017 |
| WO | WO2018/081308 A1 | 5/2018 |
| WO | WO2020/027674 A1 | 2/2020 |
| WO | WO2020/102724 A1 | 5/2020 |
| WO | WO2021/076585 A2 | 4/2021 |

OTHER PUBLICATIONS

Mo et al "Accelerated carbonation—A potential approach to seques-
ter CO2 in cement paste containing slag and reactive MgO" Cement
and Concrete Composites vol. 43, Oct. 2013, pp. 69-77 (Year:
2013).*
English translation of the Chinese Office Action and Search Report
for Chinese Application No. 202180042722.1, dated Jun. 17, 2023.
Liming et al., "Ecological environment protection and restoration
technology for alkali slag discharge landfills in coastal sea areas
(fine)," Hebei Provincial Science Technology Plan Project, Nov. 30,
2018, pp. 27-28 (8 pages total), with English translation.
International Preliminary Report on Patentability, issued in PCT/
FI2021/050446, PCT/IPEA/409, dated Sep. 14, 2022.
International Search Report, issued in PCT/FI2021/050446, PCT/
ISA/210, dated Sep. 23, 2021.
Mo et al., "Accelerated carbonation and performance of concrete
made with steel slag as binding materials and aggregates", Cement
and Concrete Composites, 2017, vol. 83, p. 138-145.
Search Report issued in Finland priority application 20205623,
dated Feb. 15, 2021.
Written Opinion of the International Searching Authority, issued in
PCT/FI2021/050446, PCT/ISA/237, dated Sep. 23, 2021.

* cited by examiner

*Primary Examiner* — Anthony J Green
(74) *Attorney, Agent, or Firm* — Birch, Stewart, Kolasch
& Birch, LLP

(57) ABSTRACT

The disclosure relates to a method for controlling carbon-
ation synthesis of silicon and/or aluminium carbonate min-
erals, wherein the concentration of dissolved silicon and/or
aluminium in a mix to be cured is adjusted to at least 1
mmol/1 before curing the mix with gas comprising carbon
dioxide ($CO_2$) having a partial pressure of $CO_2$ of at least
0.15 bar. In some embodiments of the disclosure an alkaline
substance is added to the raw material to provide the mix
where the total concentration of dissolved silicon and/or
aluminium of at least 1 mmol/1. The disclosure also relates
to a product obtainable by the methods of the disclosure as
well as to the use of the product as building material,
preferably for producing concrete-like products, more pref-
erably for elements, most preferably for pre-casted elements
and to the use of the method in construction industry or for
production of elements and/or pre-casted elements.

18 Claims, 4 Drawing Sheets

CONTROLLING CARBONATION

FIELD OF THE DISCLOSURE

The present disclosure relates to a method for controlling carbonation synthesis of silicon and/or aluminium carbonate minerals. Particularly the present disclosure relates to a method for controlling carbon dioxide uptake in a concrete-like solid product. The present disclosure further concerns the product obtained by the method as well as use of the method and obtained products.

BACKGROUND OF THE DISCLOSURE

The world cement production and concrete industry has been recognized to generate a significant part of global carbon dioxide emissions. The emissions come from the calcination process as well as from energy use.

Low carbon footprint concrete products have been developed using alternative binders replacing cement, using geopolymers and low binder amounts in concrete and using carbon dioxide for curing concrete. However, none of these methods alone have been able to produce carbon negative concrete, when both the emissions of raw materials and their processing are accounted for.

WO 2009/132692 A1 discloses a method for producing an article by carbonation of materials comprising reactive sources of alkaline earth metals, such as Ca and/or Mg. The method can be used for sequestering carbon dioxide and for recycling waste materials.

CN107324753 provides a method for carbonating a cementitious material and its preparation by utilization of greenhouse gas carbon dioxide and salt lake potassium, desalination, sea water salt, seawater potassium and other industrial byproducts comprising $MgCl_2$ and. $Mg(OH)_2$ prepared from $MgCl_2$ and then mixed with solid waste.

Although climate change and the greenhouse effect are subject for continuous product and process innovation in the field, there is still an urgent need for improvement.

BRIEF DESCRIPTION OF THE DISCLOSURE

An object of the present disclosure is to provide a method for controlling carbonation, especially in production of a concrete-like product and products obtainable by the method, to overcome the above problems related to high carbon dioxide emissions.

The object of the disclosure is achieved by the method and product obtainable by the method, which is characterized by what is stated in the independent claims. The preferred embodiments of the disclosure are disclosed in the dependent claims.

The disclosure is based on the idea of controlling the process via the total concentration of dissolved silicon and/or aluminium in a mix. The mix is cured with carbon dioxide. According to the process an alkaline substance can be used for activation of the raw material comprising silicon and/or aluminium before curing.

An advantage of the method of the disclosure is that significant carbon dioxide uptake in the product is received, thus reducing the carbon footprint of the products or even leading to products having a negative carbon footprint.

When the method is used in production of concrete-like products, the carbonates formed in the products according to the disclosure, function as binders and removes or reduces the need for using cement in the manufacture of concrete.

Processes, where cement is a raw material suffer from the high specific emissions of cement production. Although mineral carbonation methods developed in prior art to reduce the need for cement provide lower emissions for the raw material and also has some carbon dioxide binding capacity, the emissions of the prior art mineral carbonation process itself are still substantial.

Advantageously, by the method of the disclosure the $CO_2$ uptake, i.e. the amount of $CO_2$ bound to the product, is greater than the carbon footprint of the raw materials, transportation and production (Production according to module A1-3 Product stage in EN 15804+A1), thus enabling production of carbon negative concrete-like products. With the method of the disclosure, the carbon dioxide uptake in wastes used as raw material reaches over 30 wt. % counted as the mass of carbon dioxide bound per mass of raw material. Other known carbon dioxide curing methods have reached carbon dioxide uptakes of 4-10% (mass $CO_2$ bound/mass of binder). A carbon dioxide uptake in solid wastes using the method of the disclosure enables carbon negative concrete-like products, where the $CO_2$ footprint of all raw materials, their transportation and processing is smaller than the amount of carbon dioxide bound in the product.

In concrete and in concrete-like products the strength of the product mainly comes from carbonate minerals. Under natural circumstances carbonate minerals forms over long time and/or under pressure and in high temperatures. With the method of disclosure, the curing time may significantly be reduced compared to conventional concrete technology. With the method of the disclosure carbonate minerals form within 24 hours or less thus the method is suitable for manufacturing of concrete and concrete-like products under industrial conditions.

A further advantage of the method of disclosure is that the raw material and alkaline substance can be chosen from wastes or other materials with low carbon footprint. Further, waste heat, waste carbon dioxide (e.g. from flue gas, oil refinery tail gas, ethanol fermentation off-gas, biogas plant off gas) and renewable electricity may be used to further decrease the $CO_2$ footprint of the product. Preferably, with the method of the disclosure, emissions from cement manufacturing are avoided; waste carbon dioxide from other industrial operations are bound; and/or industrial wastes unavailable to conventional hydration based concrete can be used. Moreover, durability and service life of the structures might increase.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
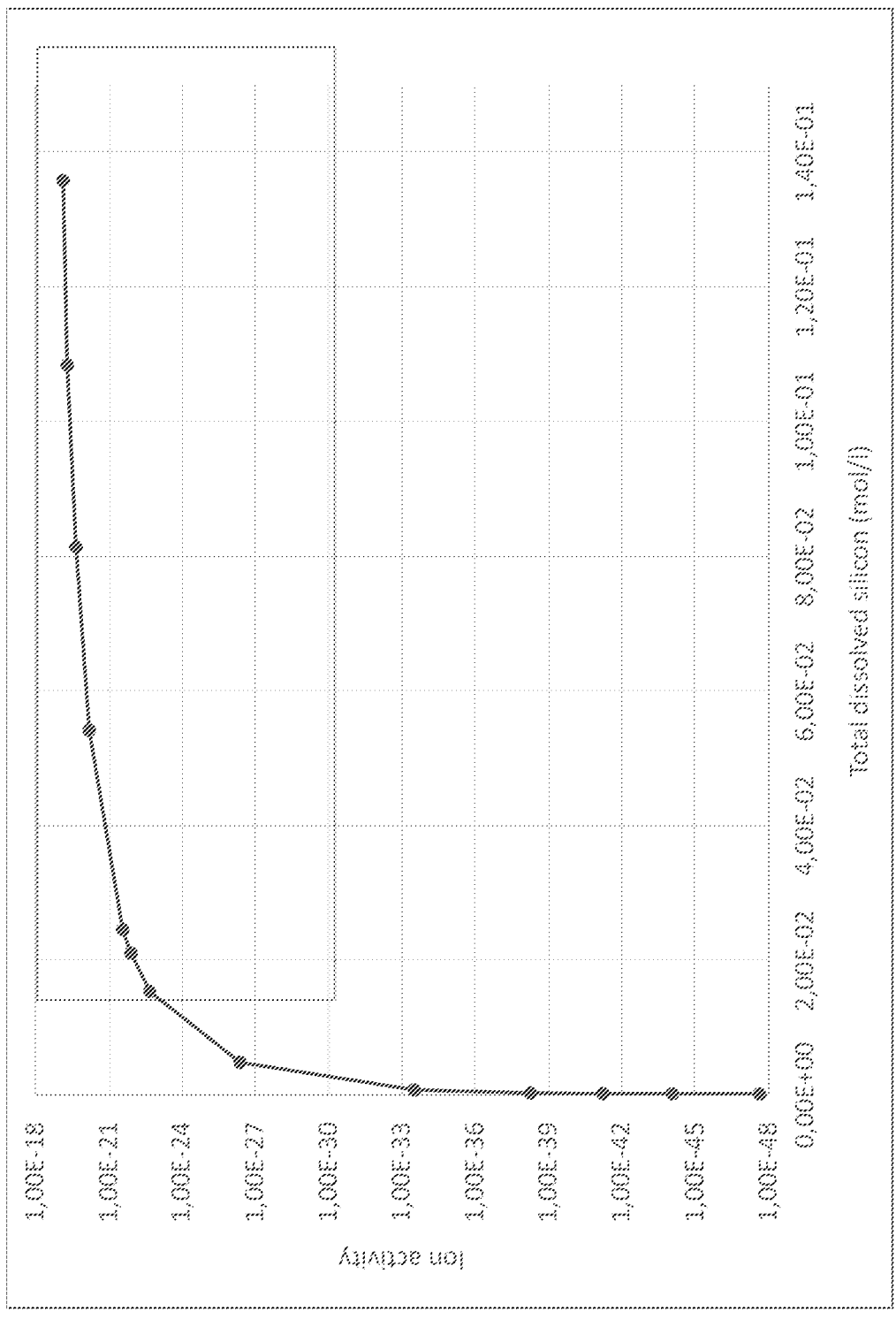
FIG. 1 shows the ionic product/ion activity of Spurrite versus dissolved silicon (mol/l).

The disclosure relates to a method for controlling carbonation synthesis of silicon and/or aluminium carbonate minerals, wherein the concentration of dissolved silicon and/or aluminium in a mix to be cured is adjusted to at least 1 mmol/1 before curing the mix with gas comprising carbon dioxide ($CO_2$) having a partial pressure of $CO_2$ of at least 0.15 bar. The mix comprises or consists of raw material comprising silicon and/or aluminium. In some embodiments of the disclosure an alkaline substance is added to the raw material comprising silicon and/or aluminium to provide the mix where the total solubility of silicon and/or aluminium is at least 1 mmol/1. Particularly the present disclosure relates to increasing $CO_2$ uptake in products during production, preferably in solid concrete-like products.

The disclosure further relates to the production of a concrete-like solid product with a method for synthesis of silicon and aluminium carbonate mineral comprising; providing a mix comprising silicon and/or aluminium; optionally casting an element of the mix; and curing the element with a gas comprising $CO_2$ having a partial pressure of $CO_2$ of at least 0.15 bar. The alkaline substance is chosen so that the total concentration of dissolved silicon and/or aluminium is at least 1 mmol/1 in the mix. In some embodiments of the disclosure providing the mix comprises mixing an alkaline substance, water and a raw material.

The disclosure also relates to a product obtainable by the methods of the disclosure as well as the use of the product as building material, preferably for producing concrete-like products, more preferably for elements, most preferably for pre-casted elements and the use of the method in construction industry or for production of elements and/or pre-casted elements.

The "raw material" as used in the disclosure is preferably solid and comprises or entirely consist of industrial wastes, residues or side streams. The raw material comprises or is chosen from slag products such as blast furnace slag, electric arc furnace slags (oxidizing and reducing), ladle furnace slag, steel slag, argon oxygen decarburization slag and basic oxygen furnace slag; ashes such as municipal waste incinerator ashes, cyclone and cloth bag dust, bio based ashes, bark ash, peat ash, coal fly ash and slag, lignite ashes, oil shale ashes and boiler ashes; tailings such as mine tailings and metal tailings such as red mud from alumina refining; other waste products such as cement kiln and by-pass dust, inorganic construction wastes and recycled concrete and any combinations thereof. The particle size of the raw material is typically mainly below 250 μm, preferably between 50 and 0.5 μm, meaning that more than 50% of the particles by volume are of that size. According to embodiments of the disclosure, the raw material itself can function as aggregate and/or binder. Alternatively, according to the embodiments of the disclosure the mix comprising raw material or raw material and alkaline substance is prepared similarly to conventional concrete technology by mixing or agitating aggregates, water and/or binders with the raw material or raw material and alkaline substance. Aggregates and/or binders used are typically aggregates and/or binders known from conventional concrete technology and the mix is typically called a raw mixture. The raw material can comprise cement-like material or it can be mixed with conventional cement. The raw material comprises silicon and/or aluminium which solubilizes from the raw material in alkaline conditions.

In some embodiments of the disclosure an alkaline substance is used to activate the raw material of the raw mixture by increasing the solubility of silicon and/or aluminium, if the concentration of dissolved silicon and/or aluminium of the raw material is below 1 mmol/1. The alkaline substance can be pure chemicals or industrial wastes, residues or side streams, especially wastes, residues or side streams of paper industry. Typically, the alkaline substance comprises or consists of basic oxides, alkali and alkaline earth metal oxides, hydroxides, silicates, sulphates and/or mixtures and/or aqueous solutions thereof. In the embodiments of the disclosure the alkaline substance can comprise or be chosen from the group consisting of Na/OH, $Na_2O$, $Mg(OH)_2$, MgO, $Ca(OH)_2$, CaO, KOH, $K_2O$, green liquor dregs, paper sludge and lime kiln residues and any combinations thereof, preferably chosen from green liquor dregs, paper sludge and lime kiln residues. The volume of the liquid phase comprising the alkaline substance is typically below the volume of formed reaction products, preferably under 150 $l/m^3$ of the raw mixture. More preferably the volume of the liquid phase is between 100 and 150 $l/m^3$. The pH of the alkaline substance is typically above about pH 11, preferable above pH 12, more preferably about pH 13. The alkaline substance is chosen so that the total concentration of dissolved silicon and/or of aluminium of the mix before curing is at least 1 mmol/1, preferably between 1 mmol and 200 mmol/1, more preferably between 10 mmol/1-100 mmol/1 including the concentration being between two of the following; 1, 1.5, 2, 3, 4, 5, 6, 7, 8, 9, 10, 11, 12, 13, 14, 15, 20, 30, 50, 70, 100, 150 and 200 mmol/1. When the solubility of silicon and/or aluminium is above or within the defined level, the ionic product of the formed mineral is high enough to cause fast formation of silicon and/or aluminium carbonate minerals.

In embodiments of the disclosure the silicon and/or aluminium typically comes from the raw material. However, alternatively part of the silicon and/or aluminium is provided to the mix from the alkaline substance. In some embodiments of the disclosure "adjusting concentration of dissolved silicon and/or aluminium in the mix" comprises measuring that the concentration of the mix, comprising for example raw material and water, is at least 1 mmol/1 before curing with gas comprising carbon dioxide ($CO_2$) having a partial pressure of $CO_2$ of at least 0.15 bar.

In embodiments of the disclosure the ratio of water to raw material in the mix is typically 0.1-1, preferably 0.3-0.7, more preferably about 0.4.

In embodiments of the disclosure the mix is optionally casted or extruded as a concrete, for example to manufacture pre-casted elements such as hollow-core slabs.

The embodiments of the disclosure may further comprise compaction of the mix before and/or during curing with gas. The method of compaction is typically chosen from compaction by rodding, ramming or tamping, compaction by vibration, for example using internal, formwork, table, platform or surface vibrators or vibratory rollers, compaction by pressure and jolting or compaction by spinning. Compaction typically comprises both setting the aggregate particles in motion thus packing the aggregate particles together as well as expelling entrapped air in order to increase the density of concrete and/or ensure a possible formwork is completely filled. Compaction typically increases the strength and general durability of the concrete or concrete-like products as well as decreases the permeability and helps to minimize its shrinkage-and-creep characteristics.

In embodiments of the disclosure the mix is further cured with a gas comprising carbon dioxide ($CO_2$) having a partial pressure of $CO_2$ of at least 0.15 bar, preferably between 0.15 and 100 bar, more preferably between 0.25 and 40 bar or 0.5 and 40 bar, most preferably between 1 and 10 bar including the pressure being a pressure between two of the following pressures; 0.15, 0.2, 0.25, 0.5, 1, 2, 3, 4, 5, 6, 7, 8, 9, 10, 11, 12, 13, 14, 15, 20, 25, 30, 35, 40, 45, 50, 60, 70, 80, 90 and 100 bar. The gas comprising $CO_2$ can be purified $CO_2$ gas ($CO_2$>99%); $CO_2$ gas concentrated to preferred extent by a gas concentration method such as absorption or adsorption methods, by membranes; or it can be unpurified $CO_2$ gas (5->99% $CO_2$), for example from power plant or factory flue gas or other side streams such as off gas from a biogas plant or ethanol fermentation or oil refinery tail gas.

In embodiments of the disclosure boosting of the mix exposure to carbon dioxide during curing can be done by adjusting the gas pressure effecting the mix before curing to the relative level of water vapour pressure. Generally, vapour pressure is the gas pressure exerted when a material is in equilibrium with its own vapour. The vapour pressure of water is the pressure at which water vapour is in thermodynamic equilibrium with its condensed state. The water vapour pressure is the partial pressure of water vapour in any gas mixture in equilibrium with solid or liquid water. As for other substances, water vapour pressure is a function of temperature and can be determined with the Clausius-Clapeyron relation.

In embodiments of the disclosure the mix exposure to carbon dioxide during curing can be boosted by air entrainment, i.e. by adding one or more surface-active agents, i.e. surfactants to the mix before agitation and curing. The surface-active agent causes formation of fine bubbles in the mix which enhances and accelerates the carbon dioxide penetration, especially to the inner parts of the mix or product. Typically, the diameter of all the bubbles is below 1 mm, preferably below 0.9 mm, more preferably below 0.8 mm, most preferably between 0.001 and 0.8 mm, including the diameter being between two of the following; 0.001, 0.005, 0.01, 0.05, 0.1, 0.2, 0.3, 0.4, 0.5, 0.6, 0.7, 0.8, 0.9 and 1 mm.

In embodiments of the disclosure the mix exposure to carbon dioxide during curing can be boosted by using higher temperatures during casting, after casting and/or during curing while at the same time maintaining the relative humidity constant, preferably at 70%. Typically the temperature is at least 15° C., preferably at least 25° C., more preferably at least 40° C., most preferably between 15 and 100° C. including the temperature being a temperature between two of the following temperatures; 15° C., 20° C., 25° C., 30° C., 40° C., 50° C., 60° C., 70° C., 75° C., 80° C., 85° C., 90° C., 95° C., 100° C. and 105° C. The source for heating can be an electric resistance or using waste heat from a power plant or mill indirectly or directly from flue gases.

In preferred embodiments of the disclosure the mix is cured until desired $CO_2$ uptake of the product is observed. The $CO_2$ uptake is counted as the mass of $CO_2$ bound per mass of raw material and it is preferably between 4 wt. % and 100 wt. %, more preferably between 10 wt. % and 45 wt. %, most preferably between 30 wt. % and 40 wt. %, including the uptake being between any of the following; 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. % and 100 wt. %. The amount can be higher than the amount of $CO_2$ set free during production of the raw material, during using the method of the disclosure and/or during manufacturing of the concrete-like element and thus the carbon footprint can be negative.

In the embodiments of the disclosure the carbonate minerals formed when the mix comprising the raw material and the alkaline substance is cured with the gas comprising carbon dioxide strengthens the structure of the product.

When the total solubility of silicon and/or aluminium in the mix is at least 1 mmol/1 the combination of carbonate minerals formed in the final product are different compared to prior art since the reaction takes place in liquid phase at controlled conditions. In the embodiments of the invention primarily alkali and earth alkaline carbonates comprising silicon and aluminium are formed. Preferably, the silicon and/or aluminium carbonate minerals formed are one or more of Tilleyite (Ca5Si2O7(CO3)2), Carletonite (KNa4Ca4Si8O18(CO3)4(OH)*(H2O)), Defernite (Ca6 (CO3)1,5(SiO4)0,5(OH)7(OH)), Fukalite (Ca4Si2O6(CO3) (OH)2), Spurrite and Paraspurrite (Ca5(SiO4)2(CO3)), Ashcroftine (K5Na5(Ca)12Si28O70(OH)2(CO3)8*8 (H2O)), Cancrinite (Na6Ca2Al6Si6O24(CO3)2), Thaumasite (Ca3Si(CO3)(SO4)(OH)6*12(H2O)), Niksergievite Ca2(Al,Si)7O10(CO3)(OH)6*nH2O, Scawtite (Ca7Si6 (CO3)018·2(H2O)), Meionite (Ca4Al6Si6O24CO3), Cancrisilite (Na7Al5Si7O24(CO3)3(H2O)), Chelyabinskite (Ca,Mg)3Si(OH)6(SO4,CO3)2*9(H2O), Silvialite (Ca,Na) 4Al6Si6O24(SO4,CO3), Vishnevite (Na,Ca,K)6(Si,Al) 12O24[(SO4)(CO3)]2-4·n(H2O), Rosenhahnite (Ca3Si3O8 [(OH)2-4x(CO3)x]), Sacrofanite ((Na,Ca,K)9Si6Al6O24 [(OH)(SO4)(CO3))]4·n(H2O)), Afghanite (Na,Ca,K)8(Si, Al)12O24(SO4,CO3)3·(H2O)), Hydrotalcite (Mg6Al2 (CO3)(OH)16*4(H2O)), Scarbroite (Al5(CO3)(OH)13*5 (H2O)), Quintinite ((Mg4Al2(OH)12CO3·4(H2O)), Motukoreaite (Na2Mg38Al24(CO3)13(SO4)8(OH)108*56 (H2O)), Hydroscarbroite (Al14(CO3)3(OH)36*n(H2O)), Alumohydrocalcite (CaAl2(CO3)2(OH)4*6(H2O)), Indigirite (Mg2Al2(CO3)4(OH)2*15(H2O)), Kochsandorite (CaAl2(CO3)2(OH)4*H2O) and Dawsonite (NaAl(CO3) (OH)2). If the raw materials in addition to silicon and aluminium also comprises alkali and alkaline earth metals, the formed alkali and alkaline earth carbonates comprising silicon and aluminium might lead to supersaturation of carbonates of other alkali and earth alkaline carbonates. In this case, carbonates of alkali and earth alkaline metals such as $CaCO_3$, $MgCO_3$ are formed in addition to silicon and aluminium carbonate minerals.

EXAMPLES

Example 1

Figure 2:
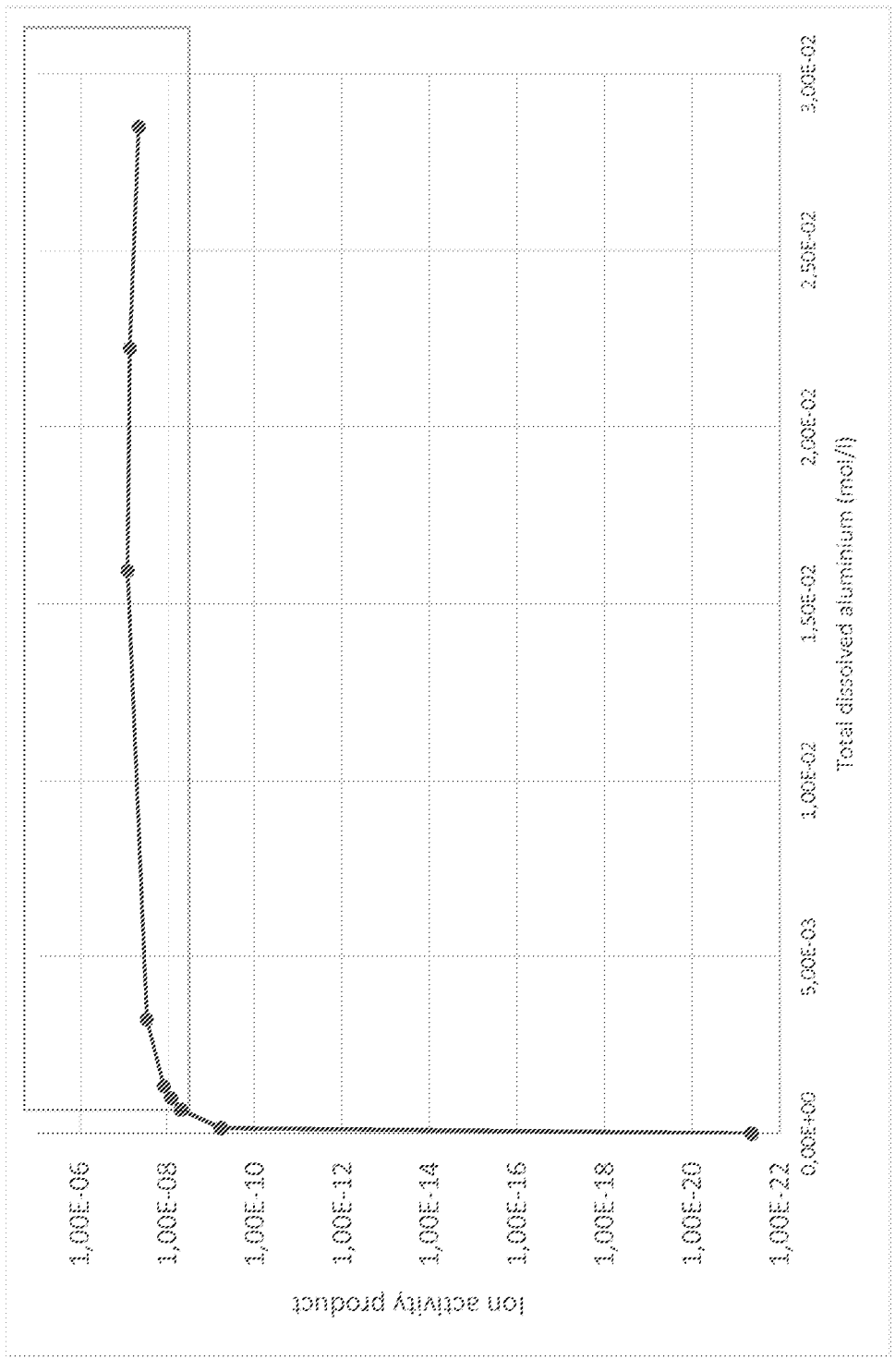
FIG. 2 shows the ionic product/ion activity of Dawsonite versus dissolved aluminium (mol/l)

The effect of silicon and aluminium solubility on the ionic product of carbonate minerals Spurrite ($Ca_5(SiO_4)_2(CO_3)$) and Dawsonite ($NaAl(CO_3)(OH)_2$) were analysed in curing conditions: pressure 10 bar (100% $CO_2$), RH 100%. by thermodynamic modelling. The results for Spurrite are presented in FIG. 1 and the results for Dawsonite are presented in FIG. 2. Since a high ionic product indicates fast formation of the carbon mineral in question, preferred solubility levels leading to high ionic products could be defined. According to solubility products, formation of Spurrite and Dawsonite is rapid in 10 bar $CO_2$ atmosphere when solubility of aluminium or silicon exceeds 1 mmol/1. Lower solubility does not provide rapid formation of desired reaction products. Higher pressure levels of $CO_2$ are industrially less relevant.

Example 2

Samples using blast furnace slag as raw material was produced using activation and as reference, without activation. Curing was performed at room temperature (25° C.) using a 40 bar partial pressure of carbon dioxide. The weight of the sample before and after curing was measured. The weight of the test pieces made without using an alkaline substance for activation did not change during curing, indicating that there was no carbon dioxide uptake in the test piece. When the same raw material was activated using NaOH the weight change was 0.60 g corresponding to 12% bound carbon dioxide.

Example 3

Figure 3:
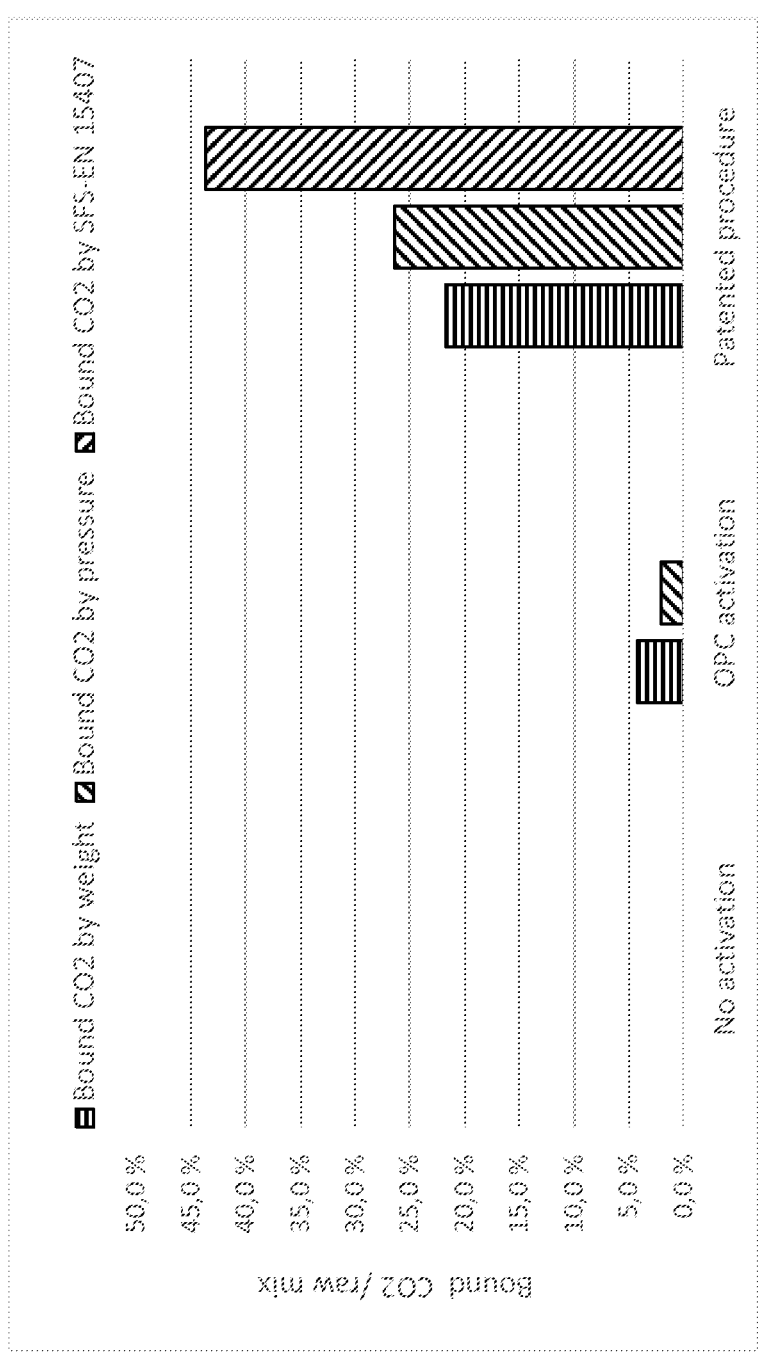
FIG. 3 shows the impact on carbon dioxide uptake of adding an alkaline substance to a raw material according to the disclosure.

$CO_2$ curing of Blast furnace slag in three alternative scenarios is presented in FIG. 3. As can be seen without additives, Blast furnace slag does not react with $CO_2$ (No activation scenario in FIG. 3). Adding 10 wt. % Portland cement as activator did not significantly increase the $CO_2$ uptake (OPC activation scenario in FIG. 3). Activating the blast furnace slag with the disclosed method using sodium hydroxide, increased the solubility of silicon and aluminium over 1 mmol/1. As a result, the amount of bound $CO_2$ increased enormously (Patented procedure scenario in FIG. 3). The bound $CO_2$ was analysed with three alternative methods: measuring the mass change of the sample during the $CO_2$ curing, measuring the $CO_2$ consumption in the process and using elemental carbon analysis according SFS-EN 15407.

Example 4

A test piece, which fulfils the strength requirements of concrete used in building structures, was prepared. The test piece was manufactured from 1350 g of blast furnace slag, 1350 g of bark ash, 1350 g of green liquor dregs, 4050 g of aggregate and 280 g of additional water using traditional methods of concrete production. The mix was casted in cylinder molds having dimensions of 300 mm (height)*100 mm (diameter). Curing of the mix was performed for 24 hours at a temperature of 80° C. using 85 bar partial pressure of carbon dioxide. The relative humidity was 100%.

The compressive strength of the produced test piece was measured, and it was 30 MPa. The carbon footprint of the concrete-like product was −60 kg/m$^3$ using standardized LCA calculations (EN 15804 stages 1-3). The carbon footprint of a conventional corresponding-concrete product is +240 kg/m$^3$.

Example 5

Figure 4:
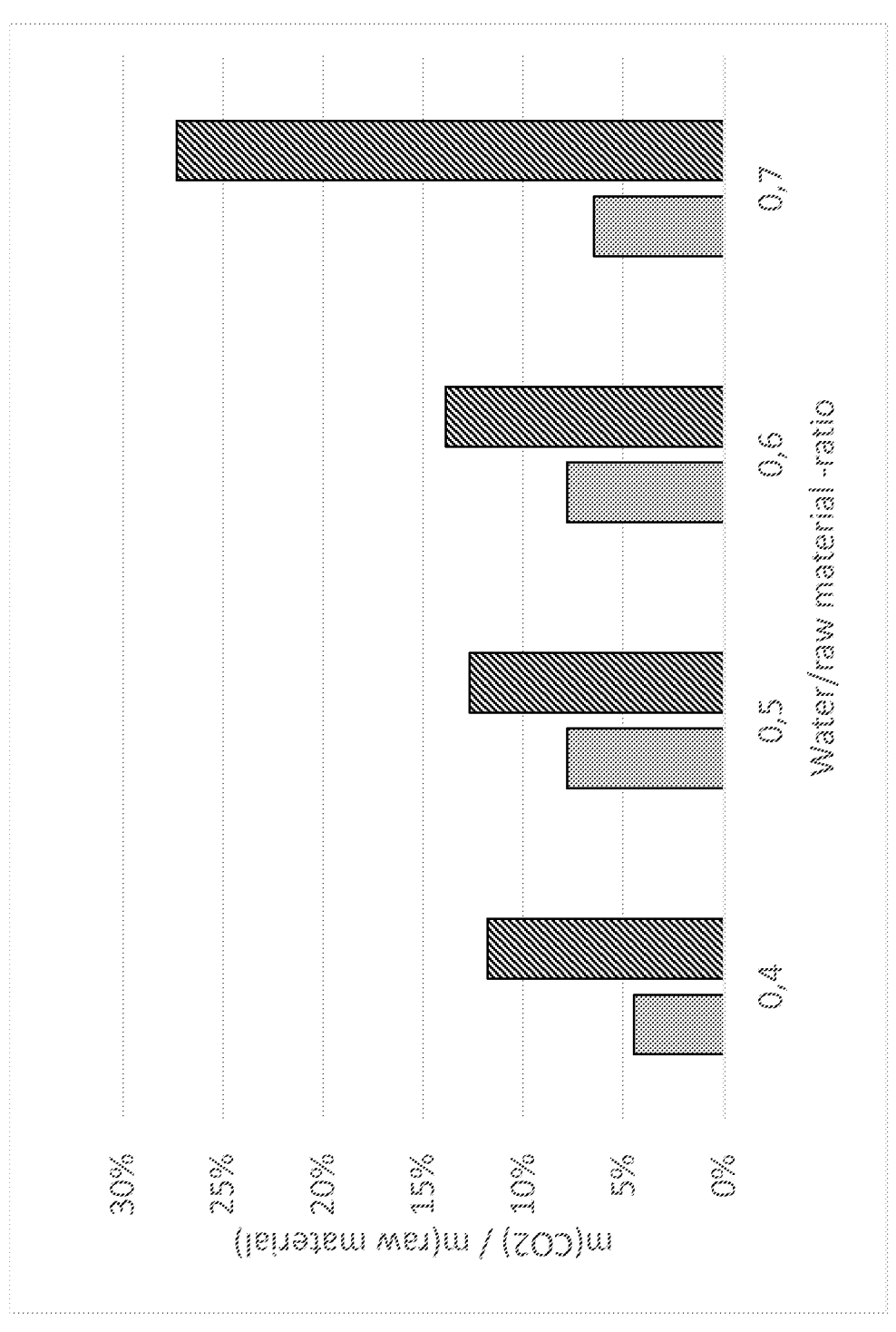
FIG. 4 shows the impact of air entrainment and water/solid matter ratios on carbon dioxide uptake.

The effect of air entrainment on the bound carbon dioxide was examined. The carbon dioxide uptake was measured for two samples prepared according to the method of disclosure. One sample was prepared by adding alkylethersulphate as surface-active agent to the mix prior to mixing, and the other product was prepared without adding a surface-active agent to the mix. The bubbles caused by the surface active agent had a diameter below 0.8 mm. The results, i.e. the bound carbon dioxide (m($CO_2$)/m(raw material)) for different water/raw material ratios are presented in FIG. 4. The first bar of every series shows the carbon dioxide uptake by the product produced without using surface-active agent and the second bar shows the carbon dioxide uptake of the product produced by adding surface-active agent.

8

The invention claimed is:

1. A method for controlling carbonation synthesis of silicon and/or aluminium carbonate minerals, wherein the method comprises providing a mix comprising raw material comprising silicon and/or aluminium; adjusting total concentration of dissolved silicon and/or aluminium in the mix to be cured to at least 1 mmol/1; and curing the mix with gas comprising carbon dioxide ($CO_2$) having a partial pressure of $CO_2$ of at least 0.15 bar, wherein the mix further comprises added water and aggregate and/or binder.

2. A method according to claim 1, wherein the method comprises adding an alkaline substance to a raw material comprising silicon and/or aluminium to provide the mix where total concentration of dissolved silicon and/or aluminium is at least 1 mmol/1.

3. The method according to claim 1, wherein the total concentration of dissolved silicon and/or aluminium is between 1 mmol/1 and 200 mmol/1.

4. The method according to claim 1, wherein the method further comprises casting an element of the mix before curing to produce a solid product.

5. The method according to claim 1, wherein $CO_2$ uptake in the product is between 4 and 100 wt. %, counted as mass of $CO_2$ per mass of raw material.

6. The method according to claim 1, wherein a surface-active agent is added to the mix before curing.

7. The method according to claim 1, wherein partial pressure of $CO_2$ is between 0.15 and 100 bar.

8. The method according to claim 1, wherein gas pressure effecting the mix before curing is adjusted to a relative level of water vapour pressure.

9. The method according to claim 1, wherein the temperature during casting, after casting and/or during curing is between 25° C. and 100° C..

10. The method according to claim 1, wherein the raw material is industrial wastes or side streams chosen from the group comprising slag products; ashes; tailings; and other waste products.

11. The method according to claim 2, wherein the alkaline substance is a pure chemical or alternatively comprises industrial wastes or side streams.

12. The method according to claim 1, wherein compaction of the mix is performed before curing.

13. The method according to claim 1, wherein water to solid matter ratio of the mix is 0.1-1.

14. The method according to claim 1, wherein one or more alkali and earth alkaline carbonates comprising silicon and aluminium are formed.

15. A product obtained by the method of claim 1, said product being a solid product.

16. The product according to claim 15, wherein the $CO_2$ uptake of the product is between 20 and 100 wt. counted as mass of $CO_2$ per mass of raw material.

17. A method for forming a building material comprising forming the building material from the product of claim 15.

18. A method for forming a building material comprising forming the building material from the product of claim 16.

* * * * *